May 19, 1959   J. DAUGHERTY ET AL   2,887,016
HEADSTOCK FOR MILLING MACHINES
Filed Dec. 7, 1955   3 Sheets-Sheet 1

Inventors
Jesse Daugherty,
Thomas K. Talbott
Carlson, Pitzner, Hubbard & Wolfe
Attorneys

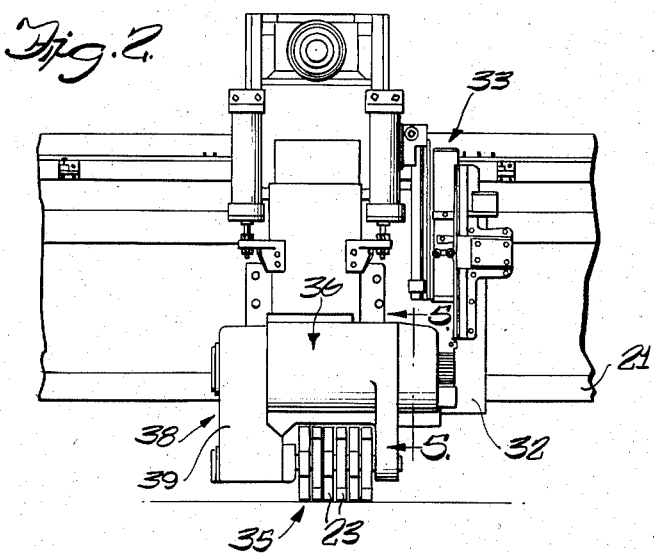
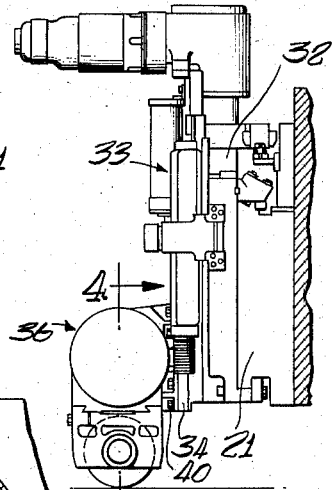
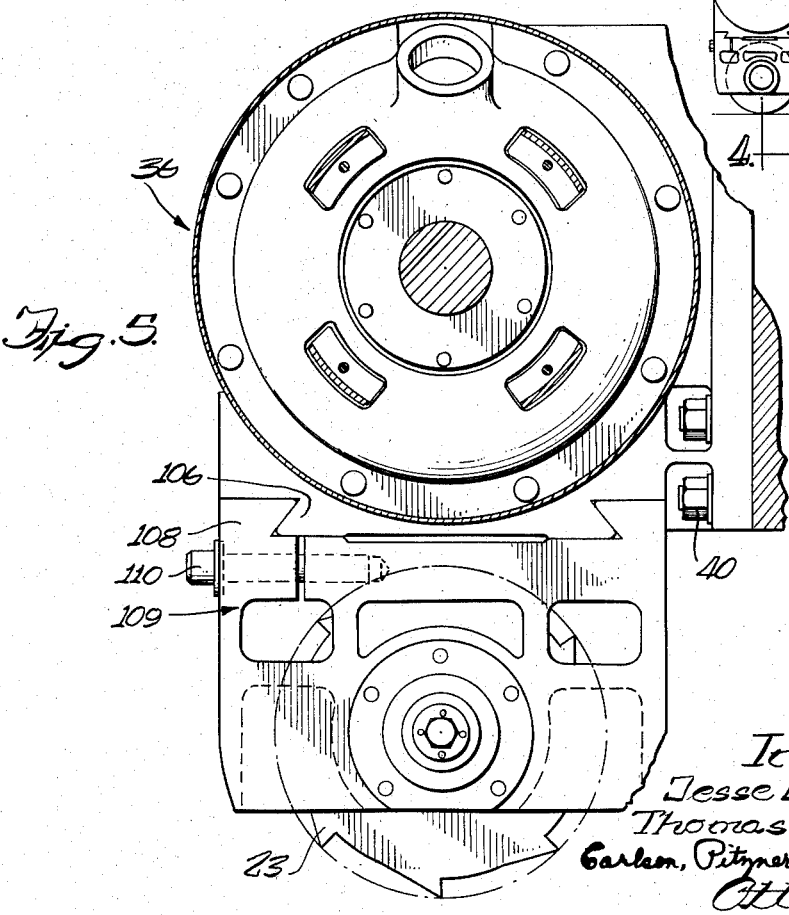

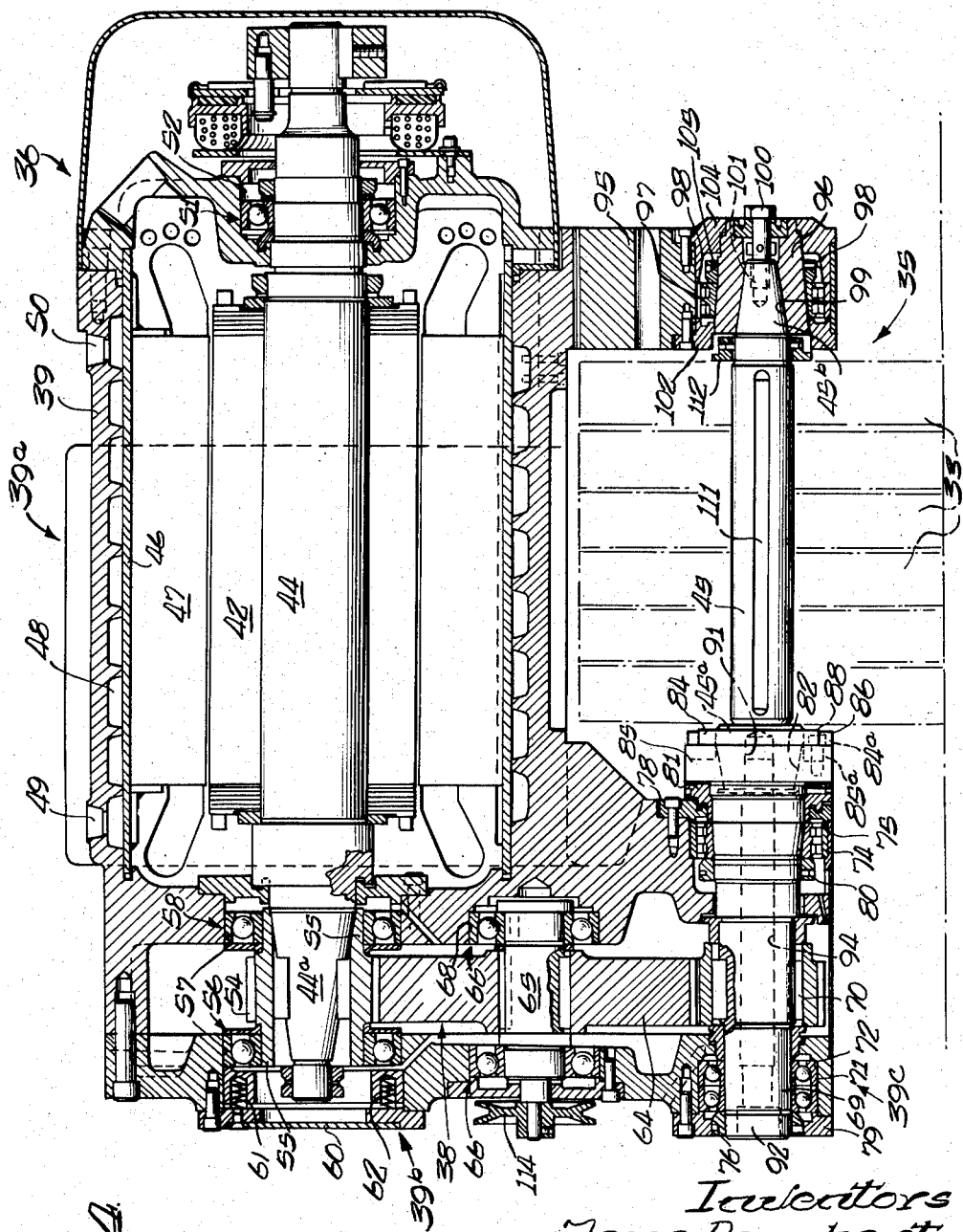

United States Patent Office 2,887,016
Patented May 19, 1959

2,887,016

HEADSTOCK FOR MILLING MACHINES

Jesse Daugherty, Fond du Lac, Wis., and Thomas K. Talbott, San Fernando, Calif.; said Daugherty assignor to Giddings & Lewis Machine Tool Company, Fond du Lac, Wis., a corporation of Wisconsin; said Talbott assignor to Lockheed Aircraft Corporation, Burbank, Calif.

Application December 7, 1955, Serial No. 551,622

4 Claims. (Cl. 90—16)

The present invention relates to high-speed planer type milling machines of the general type described in co-pending application for U.S. Letters Patent, Serial No. 239,158, filed July 28, 1951, now abandoned. More specifically, the invention pertains to a headstock for use on the cross rail of this type machine.

One object of the invention is to provide a novel milling headstock having the extreme rigidity necessary for machining workpieces to close tolerances and attaining a high surface finish thereon. A related object is to provide such a milling headstock having a cutter support arbor, an arbor drive transmission, and a drive motor all encased within and supported by a single housing of rigid and compact construction.

Another object is to provide a high-speed headstock for skin milling machines in which the drive motor shaft and the cutter support arbor are parallel to one another and in compact relationship thus allowing use of a simplified arbor drive transmission.

A further object is to provide a milling headstock having a unitary cutter support arbor and drive mechanism such that a maximum cutting depth is possible and yet rigid support is provided for the arbor.

Another object is to provide in a milling headstock having such a unitary housing an outboard arbor support which rigidly maintains the arbor in precisely aligned relation with the housing, and yet which is secured to the housing in a detachable manner for facilitating changing cutters.

Still another object of the invention is to provide a milling headstock of simple and rugged construction including a rigidly supported arbor drive transmission of economical manufacture, and capable of transmitting to the cutters high power at high rotational speeds.

Other objects and advantages will become apparent as the following description proceeds, taken in connection with the accompanying drawings, in which:

Figs. 2 and 3 are enlarged front and side fragmentary elevations, respectively, showing the illustrative headstock mounted on the cross rail of the skin miller shown in Fig. 1.

Fig. 4 is a vertical sectional view taken along the line 4—4 in Fig. 3, showing the headstock motor and the arbor drive mechanism.

Fig. 5 is a fragmentary vertical sectional view taken along the line 5—5 in Fig. 2.

Figure 1:
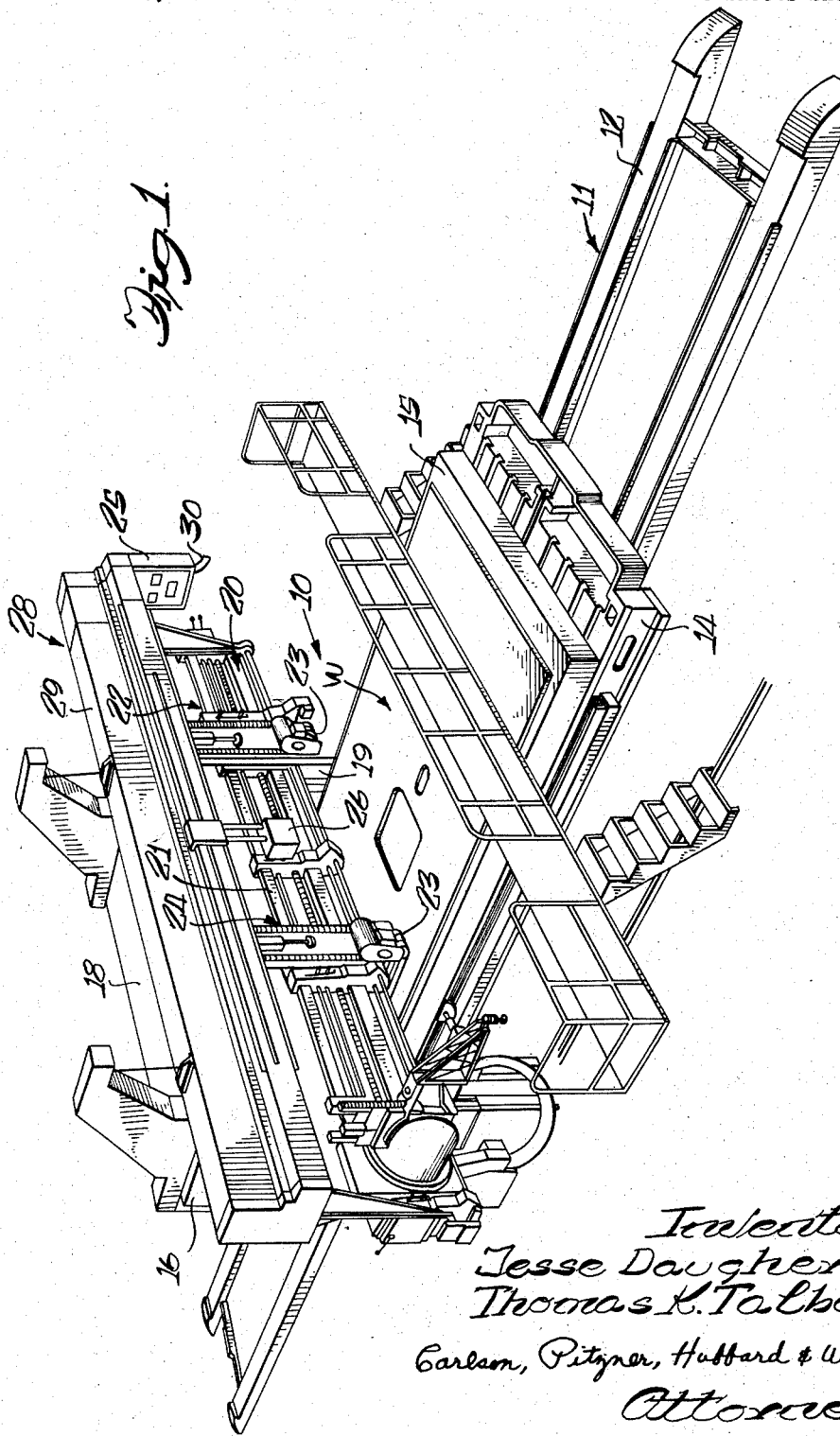
Fig. 1 is a front perspective view of an illustrative planer-type skin miller embodying the present invention.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Turning now to Fig. 1, it will be observed that the invention is there exemplified in an illustrative skin miller 10 built in the form of a large, high-speed planer-type milling machine. Although reference may be had to the above-referred-to co-pending patent application for details of the illustrative skin miller 10, it will be helpful to briefly describe the main machine elements and their function.

As will be seen, the machine 10 comprises a bed 11 having protectively covered horizontal ways 12 which slidably support a table 14. The latter may be reciprocated longitudinally on the bed 11 and ways 12, as by means of an electronically controlled drive (not shown). Mounted on the table 14 for bodily movement therewith is a relatively short, box-like vacuum fixture 15 which holds a slab-shaped work piece W for processing by the machine 10.

Straddling the bed 11 and located at the central portion thereof is a pair of spaced, upstanding columns 16, spanned by a transverse beam or "arch" 18. The front faces of the columns 16 are formed with vertical guide ways 19 which are engaged by a cross rail 20 adapted to be traversed vertically along the ways 19. The front face of the cross rail 20 is provided with horizontally extending ways 21 having a plurality of individually driven headstocks 22, 24 mounted thereon for horizontal traverse therealong. The illustrative headstocks 22, 24 are adapted for vertical profiling operations, being equipped with appropriate cutters 23 for this service.

Suitable feed drive for the headstocks 22, 24 is assembled upon the machine cross rail 20 and, as illustrated, the headstocks are also adapted to operate under tracer control. In this instance, mechanical controls for power feeding of the headstocks 22, 24 along the ways 21 of the cross rail 20 are located at opposite ends of the latter.

The headstocks 22, 24 may be raised or lowered at the option of the machine operator by means of push buttons or other controls incorporated in a fixed control panel 25 located at the right hand end of the machine 10, as viewed in Fig. 1. Similar controls are also located on a movable control panel in the form of a pendant 26 which can be traversed laterally of the machine table 14 in a direction parallel to the cross rail 20.

For accommodating various service and control lines or conduits carrying electricity, hydraulic pressure fluid, cooling water and compressed air to the headstocks 22, 24 in a manner permitting them to be traversed along the cross rail 20 without jeopardizing such lines, a multiple line feed device 28 is utilized. In this instance, the feed device 28 includes a hollow beam-like housing 29 mounted on the cross rail 20 in vertically spaced, overlying relation therewith. In addition to housing the various service and control lines for the headstocks, the housing 29 offers a convenient mounting for the fixed and movable control panels 25, 26 while at the same time accommodating the various line connections between them.

As will be seen, electric power is conducted to the housing 29 by means of one or more cables 30 entering the bottom of the fixed control panel 25 at the right hand end of the housing. Cooling water and compressed air are also admitted to this end of the housing 29 by means of other lines or conduits not shown. Hydraulic power which is required for the headstocks 22, 24 is furnished by means of a pump located at the left-hand end of the housing 29, and on the rear side thereof (not shown).

Turning now to Figs. 2 and 3 of the drawings, it will be seen that each of the headstocks 22, 24 comprises a saddle 32 slidably mounted on the ways 21 of the cross rail 20 and adapted to be traversed longitudinally thereof. For adapting each headstock 22, 24 for rapid vertical adjustment of its cutters 23, each saddle 32 carries a dual slide assembly 33, the details of which are disclosed in the above mentioned co-pending patent application. For purposes of the present disclosure it suffices to say that the slide assembly 33 includes a vertically movable outer slide 34 which also serves as a mounting for the cutters 23 and a cutter drive mechanism.

In carrying out the invention, a lay down type headstock is provided wherein a horizontal milling cutter assembly 35, and a horizontal drive motor 36 and gear transmission 38 are all supported by a unitary housing 39 which is secured to the slide 34 as by bolts 40. In this instance, the unitary housing 39 is adapted to maintain the cutter assembly 35 and drive motor 36 in vertically spaced parallel relationship thus providing a compact power unit requiring a simple form of power transmission 38. Thus, as shown in Fig. 4, the unitary housing 39 comprises an upper recessed portion 39a for accommodating the motor 36, a side recessed portion 39b for encasing the gear transmission 38, and a lower portion 39c for supporting the cutter assembly 35. Each motor 36 includes a rotor core 42 suitably keyed to a horizontal motor shaft 44, and each cutter assembly 35 includes a horizontal cutter support arbor 45 spaced below the motor shaft and drivingly connected therewith through the gear transmission 38.

The individual drive motors 36 of the headstocks 22, 24 are of the high speed type and are susceptible of being operated at various speeds dictated by the requirements of particular cutting operations. Preferably, the motors 36 are water cooled, alternating current machines which provide a wide range of rotative speeds when operated from a power source of controllable and variable frequency.

As will be seen, each motor 36 includes an open end cylindrical shell 46 which fits within the housing 39 and surrounds the annular motor stator core 47. Provision is made for circulation of cooling water around the motor 36 in the form of a plurality of annular passages 48 situated between the housing 39 and the shell 46, suitable water inlet and outlet openings 49, 50, respectively, being furnished in the upper portion of the housing.

Suitable bearing support for the motor shaft 44 is provided at each of its ends. From Fig. 4 it will be observed that one end (right hand end) of the motor shaft 44 is journaled in a suitable angular contact ball bearing 51 seated in a recess 52 provided in one end of the housing portion 39a. The opposite end of the motor shaft 44 terminates in a tapered portion 44a on which is keyed a helical gear 54 carrying shoulders 55 journaled in a pair of axially spaced angular contact ball bearings 56, 58 the latter being seated in suitable recesses 57 provided in the housing portion 39b.

Allowance is made for thermal expansion of the motor shaft 44 without overloading the bearings 51, 56 and 58 by providing for free axial movement at one end of the shaft. Thus the outer race of the ball bearing 51 is free or "floating" for undergoing axial movement within the recess 52. The other end of the motor shaft 44 is suitably restrained from axial movement by an annular retaining ring 59 arranged side-by-side with the bearing 56 in the recess 57 and held against the outer race of this bearing by means of an end cap 60. For limiting the thrust load exerted on the bearing 56 during axial expansion of the motor shaft 44, a plurality of circumferentially spaced helical compression springs 61 are interposed between the ring 59 and the end cap 60, being carried in suitable ring recesses 62. When the force exerted on the retaining ring 59 due to the expansion of the shaft 44 exceeds a predetermined value, the retaining ring is moved against the bias of the springs 61 thus restraining the axial thrust load on the bearing 56.

The gear transmission 38 provided includes a relatively large idler gear 64 arranged below the tapered portion 44a of the motor shaft and adapted to mesh with the helical gear 54. As will be seen, the idler gear 64 is keyed to a relatively short idler shaft 65 journaled for rotation in a pair of spaced angular contact ball bearings 66 disposed in suitable recesses 68 provided in the housing portion 39b. Transmission of power to a driven shaft or spindle 69 arranged parallel with the motor shaft 44 and disposed in the housing portion 39c is completed through a gear 70 keyed to the spindle 69 midway between its ends and meshed with the idler gear 64.

The ends of the horizontal spindle 69 are journaled, respectively, in a double row angular contact ball bearing 71 positioned in a suitable housing recess 72 and a cylindrical roller bearing 74 seated in a housing recess 75. It will be observed that the spindle 69 is held against axial translation by suitable retainers 76 and 78 provided at each of its ends and lock nuts 79, 80 and 81. Attention is drawn to the fact that the gear 70 is of the same diameter as the helical gear 54 so that the rotational speed of the two gears and, accordingly, the two corresponding shafts 44 and 69 is the same.

Turning now to the construction details of the cutting assembly 38, it will be seen from Fig. 4 that the cutting arbor 45 which carries the cutters 33 is disposed horizontally within the housing portion 39c so as to be parallel with the motor shaft 44 and is arranged in axial alignment with the power driven spindle 69. In this instance, the arbor 45 has tapered portions 45a and 45b, respectively, at each of its ends. For rotatively coupling the power driven spindle 69 and the arbor 45 the inner end of the spindle is formed with an internal tapered recess 82 for receiving therein the complementarily tapered arbor portion 45a. As will be observed, the arbor includes near the tapered portion 45a a flange-like shoulder 84 which normally abuts a similar flange 85 provided on the inner end of the spindle 69. Rigid driving connection between the spindle 69 and arbor 45 is effected through the provision of a plurality of keys 86 which are secured to and project from the flange 85. The keys 86 thus are held in circumferentially spaced flange slots 85a by means of cap screws 88 which threadably engage the spindle flange 85. Driving engagement between the spindle and arbor 45 occurs through the engagement of the rigidly held keys 86 with suitable slots 84a provided in the shoulder 84 in aligned relationship with the keys.

For assuring firm seating of the arbor portion 45a within the spindle recess 82, a screw threaded counterbore 91 is provided in the arbor portion 45a and an elongated draw bolt 92 extends through a central hollow portion 94 of the spindle to threadably engage the counterbore to thereby tightly draw the arbor and spindle together axially.

For detachably mounting the other end 45b of the arbor, an outboard support member 95 is removably secured in depending relationship to the lower portion of the housing 39 and opposite the power driven spindle 69. In this instance, the lower portion of the support member 95 houses a cylindrical bearing block 96 journaled in a double row roller bearing 97 seated in a recess 98. From Fig. 4, it will be seen that the bearing block 96 has an internal tapered bore 99 for receiving therein the arbor portion 45b, and a draw bolt 100 extends inwardly through the member 95 and is received in an arbor counterbore 101 for assuring secure seating of the arbor within the member 95. Axial movement of the bearing block 96 and bearing 97 is restrained by suitable retainer rings 102 and 104 provided at opposite ends of the block and a lock nut 105 tightly couples the block and bearing together.

Means is provided for detachably connecting the outboard support member 95 to the housing 39 in order to facilitate changing the cutters 33 without disturbing the arbor alignment. Thus, as seen from Fig. 5, the upper end of the support member 95 and the undersurface of the housing portion 39a are slidably joined by a dovetail connection. Here, the housing portion 39a carries dovetail ways 106 adapted to be received in mating ways 108 provided at the upper end of the member 95.

Attention is drawn to the provision in the upper portion of the member 95 of a yoke 109 which may be pinched together by a cap screw 110 to thereby clamp the mating ways 106, 108 tightly together. It is to be noted that when the outboard arbor support member 95 is tightly secured to the housing 39, only the yoke portion 109 of the member 95 undergoes deformation so that accurate alignment of the arbor 45 with the power driven spindle 69 is unaffected by the clamping action.

One or more of the milling cutters 33, shown in phantom in Fig. 4, are secured to the arbor 45 by a long key (not shown) placed in a key way 111 provided axially along the arbor and through mating key ways in the cutters. For securing the cutters 33 against axial movement once they are mounted on the arbor 45 a nut 112 threadably engaged with the arbor near its end portion 45b is provided for tight engagement against the cutters to hold them firmly between itself and the flange-like shoulder 84. Any practicable number of cutters 33 may be employed on the arbor 45 and suitable spacers (not shown) may be added when the total width of the cutters employed is not sufficient to permit tightening action by the nut and shoulder 112, 84, respectively.

Suitable lubrication for the headstock components is provided in a conventional manner. Preferably, the housing 39 is provided with suitable passages to supply mist lubrication to all bearings except the slow speed bearings 66. A pulley 114 shown in Fig. 4 keyed to the extreme outer end of the relatively short idler shaft 65 serves as the power take off for the spray lubrication system (not shown). The bearings 66 and all of the transmission gears are lubricated by a spray system which includes a pressure supply pump and a suction return pump (not shown) which are both driven by a V-belt from the pulley 114. Lubricant is supplied through various lines and oil holes and collects in a sump (not shown) for return to a reservoir.

To remove the cutter support arbor 45 and the cutters 33, the clamping screw 110 holding the yoke 109 in compressed relation is loosened to allow movement of the outboard arbor support member 95 along the dovetail ways 106. The draw bolt 100 is then unscrewed and backed off facilitating movement of the support member 95 to the right as viewed in Fig. 4. With the draw bolt 100 disengaged from the arbor 45, the draw bolt 92 is then free to be removed, so that the arbor and cutters 33 are completely removable from the headstock.

One of the advantageous features of the invention is that a unitary motor and gearing transmission mechanism is provided in a headstock in such a compact manner that a maximum cutting depth is possible. Thus, the extreme lower portion of the outboard arbor support member 95 extends no lower toward a workpiece than the opposite housing portion 39b.

Another of the advantages of the invention is that a single housing construction 39 supports the motor 36, gear transmission 28 and its related gearing and bearings, and the cutter assembly 35 so as to provide the extreme rigidity necessary for highly accurate machining and attainment of superior surface finish on the work piece.

We claim:

1. In a planer-type milling machine, the combination of a table, a cross rail supported in overlying relation with the table, a headstock susceptible of translational movement longitudinally of said cross rail, said headstock including a housing, a horizontal driving motor mounted within said housing, a vertically arranged gear transmission in said housing and connected to the motor, a horizontal spindle journaled in said housing and having a geared connection with the motor shaft, said horizontal spindle having a tapered recess therein for receiving one end of a cutter arbor, a support member projecting downwardly from said housing in general alinement with said horizontal spindle, a bearing block adjustably supported in said support member, and an outboard bearing carried by said bearing block for journaling the opposite end of the cutter arbor.

2. In a planer-type milling machine, the combination of a table, a cross rail supported in overlying relation with the table, a headstock susceptible of translational movement longitudinally of said cross rail, said headstock including a housing, a horizontal driving motor mounted within said housing, a power transmission in said housing and connected to the motor, a horizontal spindle journaled in said housing and having a connection with the motor shaft, said horizontal spindle having a connection thereon for receiving one end of a cutter arbor, a support member detachably supported downwardly from said housing in general alinement with said horizontal spindle, and an outboard bearing carried by said support member for journaling the opposite end of the cutter arbor.

3. In a planer-type milling machine having a headstock mounted for translational movement along a cross rail, the combination comprising a housing included on said headstock and having mounted therein a horizontal driving motor, a power transmission in said housing including a pinion fixed to the end of the motor shaft, a horizontal spindle journaled in said housing and having a pinion fixed thereon, an independently journaled intermediate gear meshing with said motor pinion and with said spindle pinion, said horizontal spindle having a tapered socket therein for drivingly receiving one end of a cutter arbor, a support member projecting downwardly from said housing in general alinement with said horizontal spindle, dovetail means for detachably supporting the support member from said housing, and an outboard bearing carried by said support member for rotatably supporting the other end of the cutter arbor.

4. A headstock for use in a machine tool comprising, in combination, a single housing, an electric motor mounted in said housing and including a main motor shaft, a cutter arbor journaled in said housing in parallel, closely spaced, and substantially laterally opposite relationship with said main motor shaft, and power transmission gearing disposed within said housing and interposed between said motor shaft and said cutter arbor for effecting a compact and rigid cutting assembly.

References Cited in the file of this patent

UNITED STATES PATENTS

| 1,355,142 | Hanson | Oct. 12, 1920 |
| 1,650,422 | Brown | Nov. 22, 1927 |
| 1,675,374 | Muller et al. | July 3, 1928 |
| 1,775,084 | Beaman | Sept. 9, 1930 |
| 2,516,294 | Berthiez | July 25, 1950 |
| 2,557,582 | Turrettini | June 19, 1951 |

FOREIGN PATENTS

| 906,037 | Germany | Mar. 8, 1954 |

OTHER REFERENCES

"American Machinist," Aug. 6, 1903, vol. 26, page 1105.